(12) United States Patent
Taniguchi

(10) Patent No.: US 6,996,407 B2
(45) Date of Patent: Feb. 7, 2006

(54) SHARED-USE PORTABLE TELEPHONE AND METHOD OF SHARING PORTABLE TELEPHONE

(75) Inventor: Keiichi Taniguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 573 days.

(21) Appl. No.: 09/961,915

(22) Filed: Sep. 24, 2001

(65) Prior Publication Data

US 2002/0045457 A1 Apr. 18, 2002

(30) Foreign Application Priority Data

Sep. 27, 2000 (JP) ........................................ 2000-293443

(51) Int. Cl.
*H04Q 7/20* (2006.01)

(52) U.S. Cl. ...................... 455/463; 455/410; 455/411; 379/93.03; 379/903

(58) Field of Classification Search ................. 455/410, 455/411, 414.1, 418, 463, 566; 379/82, 93.03, 379/127.06, 903
See application file for complete search history.

(56) References Cited

U.S. PATENT DOCUMENTS

| | | | | |
|---|---|---|---|---|
| 4,528,459 A | * | 7/1985 | Wiegel ........................ 307/66 |
| 5,740,237 A | * | 4/1998 | Malik et al. ........... 379/211.02 |
| 5,864,613 A | * | 1/1999 | Flood ......................... 379/188 |
| 5,933,773 A | * | 8/1999 | Barvesten ................... 455/411 |
| 5,950,013 A | * | 9/1999 | Yoshimura et al. ............ 710/5 |
| 5,987,325 A | * | 11/1999 | Tayloe ..................... 455/435.2 |
| 6,104,913 A | * | 8/2000 | McAllister ................. 455/41.1 |
| 6,128,511 A | * | 10/2000 | Irie ............................ 455/558 |
| 6,195,568 B1 | * | 2/2001 | Irvin ........................... 455/563 |
| 6,253,074 B1 | * | 6/2001 | Carlsson et al. .......... 455/414.2 |
| 6,324,538 B1 | * | 11/2001 | Wesinger, Jr. et al. ........ 707/10 |
| 6,463,293 B1 | * | 10/2002 | Guyot et al. ................ 455/466 |
| 6,629,136 B1 | * | 9/2003 | Naidoo ........................ 709/219 |
| 6,704,405 B1 | * | 3/2004 | Farris et al. ............ 379/215.01 |

FOREIGN PATENT DOCUMENTS

| | | |
|---|---|---|
| JP | 5-327854 | 12/1993 |
| JP | 7-203015 | 8/1995 |
| JP | 8-149557 | 6/1996 |
| JP | 10-51372 | 2/1998 |
| JP | 11-215231 | 8/1999 |

* cited by examiner

*Primary Examiner*—William Trost
*Assistant Examiner*—James D. Edward
(74) *Attorney, Agent, or Firm*—Dickstein, Shapiro, Morin & Oshinsky, LLP.

(57) ABSTRACT

A shared-use portable telephone has a ROM, RAM and control sections. The ROM section comprises a password area for holding passwords and a personal information area for holding personal information. The password and personal information areas include respective sub-areas that a plurality of users can utilize, respectively, based on their passwords. The control section copies the personal information stored in the personal information sub-areas to the RAM section that the users use in common and then to the personal information sub-area of the ROM section. The personal information sub-areas of the ROM section are used independently of each other, one for each user and never for any other user. Every time the portable telephone is used, the information stored in the RAM section is copied into the specific area of the ROM section. Each user can access his or her personal information, but cannot access the personal information of the other users.

11 Claims, 5 Drawing Sheets

SHARED-USE PORTABLE TELEPHONE AND METHOD OF SHARING PORTABLE TELEPHONE

BACKGROUND OF THE INVENTION

1. Field of the Invention

The present invention relates to a shared-use portable telephone and a method of sharing a portable telephone. More specifically, the present invention relates to a portable telephone that is shared by several persons, appropriately utilizing a telephone directory function of the portable telephone, and a method of sharing such a portable telephone.

2. Description of the Related Art

Japanese Laid Open Patent Application (Heisei 11-215231) discloses a portable type communication terminal such as a portable telephone, which is shared by several persons. As shown in FIG. 1, the portable type communication terminal comprises a CPU 101, a ROM 102 and a RAM 103. The CPU 101 includes a user identifying section 104 that manages two types of information. The first-type information is user identification (ID) code. The second-type information is secret code assigned to the user. The ROM 102 stores a program 105. The RAM 103 includes a personal information storage section 106 and a re-dial number storage section 107.

When one of the users starts authenticating himself, the portable type communication terminal displays an input request message on its LCD section (not shown), requiring the user to input his ID code and secret code. The user inputs his ID code and secret code in response to the input request message. The user identifying section 104 incorporated in the CPU 101 checks whether or not an ID code and a secret code inputted by the user are identical to the user ID code and secret code of the user which are managed by the user identifying section 104. If the ID codes and the secret code inputted by the user are identical to those managed by the user identifying section 104, the personal information and the re-dial number stored in the RAM 103 can be read from the personal information storage section 106 and the re-dial number storage section 107, respectively. Further, the user can write new personal information and a new re-dial number into the personal information storage section 106 and the re-dial number storage section 107, respectively.

When the user finishes authenticating himself or herself, the CPU 101 can write into or read out from the RAM 103 only about management information including the personal information and re-dial number of the user.

In this portable type communication terminal, the data stored in the RAM 103 is erased when all power accumulated in the battery or built-in backup battery, either provided in the portable type communication terminal, is consumed. This is because power is no longer supplied to the RAM 103. Thus, the data stored in the personal information storage section 106 and re-dial number storage section 107 is therefore erased immediately after running out of the battery or the backup battery. Once the ID data stored in the RAM 103 is erased, it is no longer possible for the portable telephone to perform data communication with any switching station and the great influence comes out to operate a system including the portable telephone. In view of this point, the ID data cannot be stored in the RAM 103 of the portable type communication terminal disclosed in Japanese Laid Open Patent Application (Heisei 11-215231).

It is required that each person who can use the portable type communication terminal can access to only the information he or she has right to manage, and share the portable type communication terminal without accessing to the information about any other persons. Also, it is required that the personal information about the persons can not be erased by all means.

Japanese Laid Open Patent Application (Heisei 8-149557) discloses a so-called "cord-less telephone system", which seems to be related to the present invention. In the cordless telephone system, when any person sharing a mobile station inputs his or her user ID from the mobile station, the user ID thus input is stored into the common user management table that is provided in the main apparatus. When the data showing the condition of the mobile station (whether the station is used by only one person or shared by persons) and the user ID of the person who is holing the station are input, the data showing the condition of the mobile station is stored into the mobile-station condition management table provided in the main apparatus. If the mobile station is used by only one person, the user ID of the person who is holding the mobile station is stored into the shared user management table provided in the main apparatus. The main apparatus comprises switching control means and an extension number management table. To cause the switching control means to determine which user a call should be transmitted to, the main apparatus retrieves the user ID of that person, from the extension number management table. Based on the user ID retrieved, the main apparatus retrieves the mobile station, which registered as the user to be transmitted to, from the common user management table. From the mobile station thus retrieved, the switching control means determines that the call should be transmitted to the mobile station. The call can therefore be transmitted to the mobile station that exists nearer to the user than any other mobile station, no matter whether the mobile station is held by one person or shared by several persons.

SUMMARY OF THE INVENTION

An object of the present invention is to provide a shared-use portable telephone with which each user can access to only information he or she manages without accessing to information of any other persons and in which such information is never erased. Another object of the invention is to provide a method of sharing a portable telephone of this type.

Means for achieving the object will be described below using reference numerals and symbols used in "Embodiments of the invention". These reference numerals and symbols are added so that relation between the description of "Scope of the Patent to be Claimed" and the description of "Embodiments of the invention" is made clear. However, it is never permitted to use the reference numerals and symbols for the interpretation of technical scopes of the inventions described in "Scope of the Patent to be Claimed" and the description of "Embodiments of the invention".

A shared-use portable telephone according to the first aspect of the present invention comprises a control section (2), a ROM section (7), and a RAM section (8). The ROM section (7) comprises a password area (12) in which password information are hold and a personal information area (13) in which personal information of a plurality of users are hold. The password area (12) includes a plurality of independent password sub-areas ("a" to "e") which the plurality of users can use based on each password information. The personal information area (13) includes a plurality of independent personal information sub-areas ("aa" to "ee") which corresponds to the plurality of independent password sub-areas ("a" to "e") and can be used the plurality of users, respectively. The control section (2) copies into the RAM (8) the personal information stored in the personal information sub-areas ("aa" to "ee"). It also copies the personal information stored in the RAM section (8), into the personal information area (13) of the ROM section (7). The RAM section (8) has a telephone directory-use temporary area (14), in which the personal information may be temporarily copied or stored. The personal information sub-areas ("aa" to "ee") of the ROM section (7) are divided every user and is independently used. That is, personal information sub-areas are used by a particular person, never shared by any other person. The RAM section (8) is shared by the plurality of the users. Every time the shared-use portable telephone is used, the information stored in the RAM section (8) is copied into the specific area of the ROM section (7), which is peculiar to the user. Hence, such a situation can be avoided that one user participates in the personal information of the other user. Once stored into the personal information area 13, the personal information is never erased.

The personal information may be telephone directory information, ID information or function-setting information, each item of which is specific to one person who can use the portable telephone.

A method of sharing a portable telephone according to a second aspect of the present invention, comprises: inputting a password assigned to a user; inputting a log-in name assigned to the user; selecting one of the password sub-areas ("a" to "e") of the ROM section (7), which is associated with the password, based on the password and the log-in name; determining whether or not the inputted password is identical to the password held in the selected password sub-area to thereby authenticate the user; selecting one of the personal information sub-areas ("aa" to "ee") of the ROM section (7), which maintains the personal information related with one of users based on the authentication; copying into the RAM section (8) the personal information held in the selected personal information sub-area of the ROM section (7); and copying the personal information held in the RAM section (8) into the personal information sub-area ("aa" to "ee") of the ROM section (7), which has been selected.

If the user is not authenticated, the power supply to the portable telephone is automatically turned OFF. The personal information stored in the RAM section (8) can be altered. When the personal information is altered, the altered personal information is copied into the personal information sub-areas ("aa" to "ee") of the ROM section (7), which are peculiar to the users. When the power supply is OFF, the personal information in RAM part (8) is copied to the personal information area ("aa" to "ee") of ROM part (7) and the information will not be erased in the ROM section (7). A log-in name is input before a password is input. Preferably, the ROM section (7) is a nonvolatile memory or a flash memory.

DESCRIPTION OF THE PREFERRED EMBODIMENTS

Figure 1:
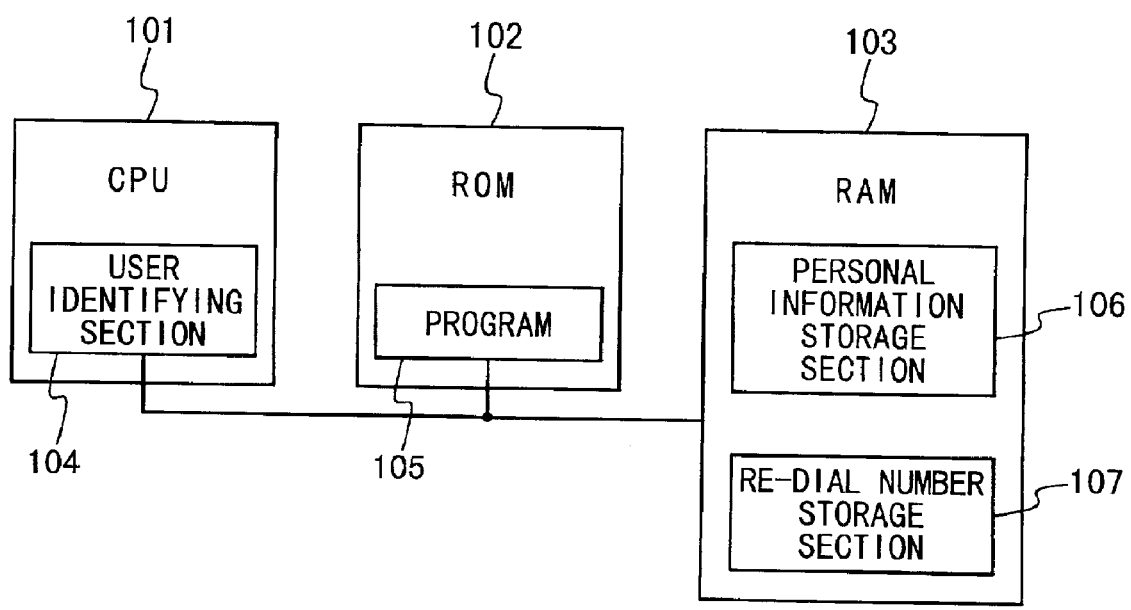
FIG. 1 is a block diagram showing a conventional shared-use portable telephone.
Figure 2:
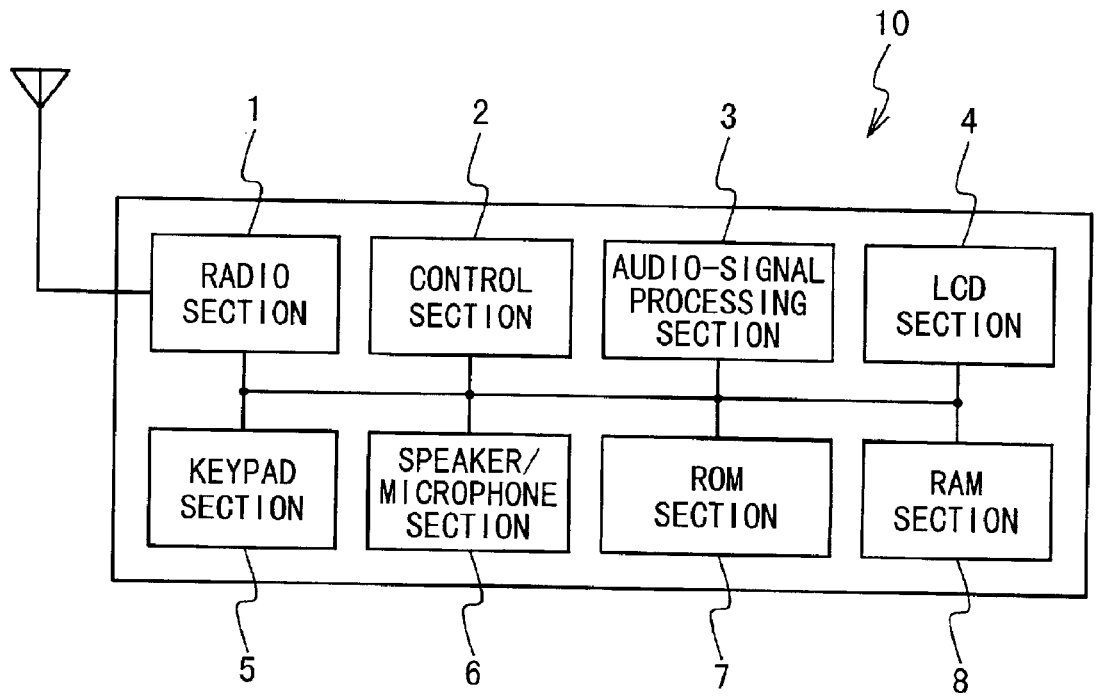
FIG. 2 is a block diagram showing a configuration of a shared-use portable telephone according to an embodiment of the present invention.

An embodiment of the present invention will be described with reference to the accompanying drawings. As shown in FIG. 2, the shared-use portable telephone according the embodiment of the present invention comprises a radio section 1, a control section 2, an audio-signal processing section 3, an LCD section 4, a keypad section 5, a speaker/microphone section 6, a ROM section 7, and a RAM section 8. The sections 1 to 8 are connected to one another. The keypad section 5 includes ten numeric keys. An antenna is connected to the radio section 1. The control section 2 controls the other sections 1 and 3 to 8 in accordance with the programs stored in the ROM section 7.

The audio-signal processing section 3 receives an analog audio signal from the speaker/microphone section 6 and converts the analog audio signal to a digital audio signal and sends the digital audio signal to the radio section 1. The radio section 1 converts the digital audio signal to a radio-frequency signal and transmits the radio-frequency signal through the antenna. The antenna receives a radio-frequency signal and sends the received radio-frequency signal to the radio section 1. The radio section 1 converts the radio-frequency signal to a digital audio signal and sends it to the audio-signal processing section 3. The audio-signal processing section 3 converts this digital audio signal to an analog audio signal and sends it to the speaker/microphone section 6. The LCD section 4 displays various messages generated fir the persons who share the shared-use portable telephone. Any person authorized to use the shared-use portable telephone can operate the keypad section 5 to input various data and various instructions before he or she starts talking to any other person over the shared-use portable telephone. The RAM section 8 temporarily stores working data that the control section 2 uses to perform various functions.

The ROM section 7 is an electrically erasable, programmable memory that can store and erase data in units of blocks of any desirable size, under the control of the control section 2. That is, the ROM section 7 is a non-volatile memory. Preferably, it is a flash ROM that can store and erase data in units of blocks of a given size.

Figure 3:
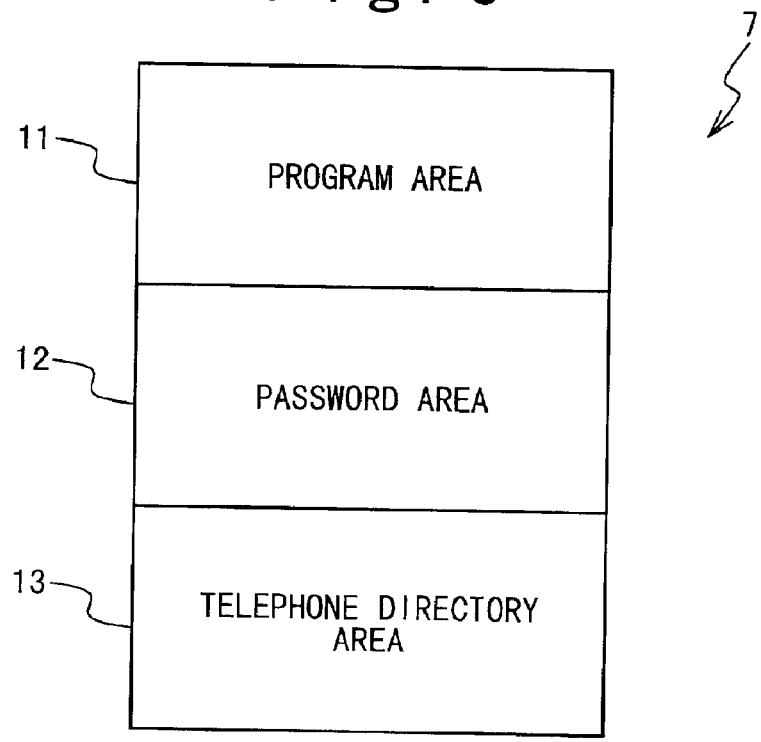
FIG. 3 is a conceptual representation of the ROM section shown in FIG. 2.

FIG. 3 illustrates a memory map of the ROM section 7. As seen from FIG. 3, the ROM section 7 comprises a program area 11, a password area 12, and a telephone directory area 13. The program area 11 stores the program for the control section 2 to perform various operations. The password area 12 stores password information or password data items respectively registered by the users of the shared-use portable telephone. The telephone directory area 13 stores telephone directory information or telephone directory data items that is registered by the user and includes information about the person the user may often talk to through the shared-use portable telephone. Each of the password area 12 and the telephone directory area 13 is composed of a plurality of sub-areas corresponding to a plurality of users of the shared-use portable telephone, respectively. Thus, more than one user can share one shared-use portable telephone 10. Each sub-area is independent each other.

Figure 4:
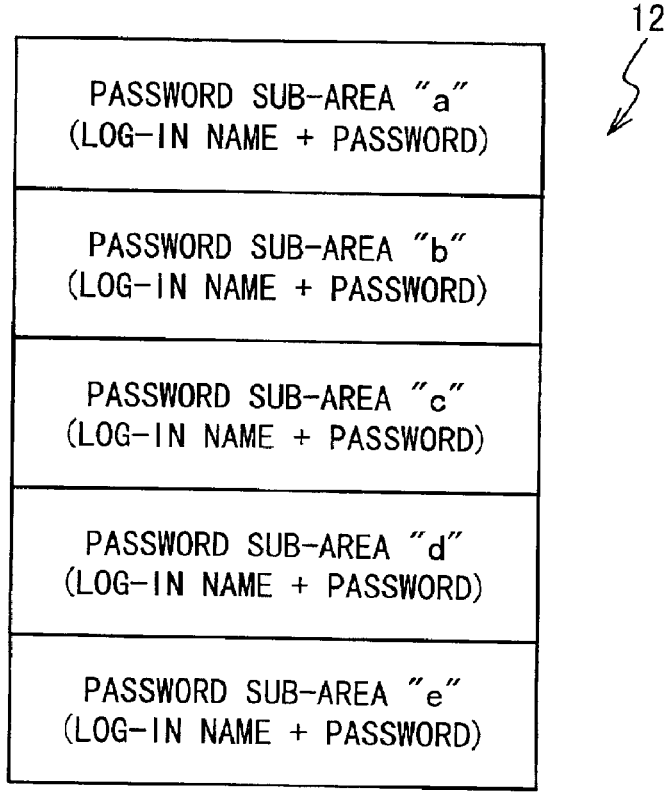
FIG. 4 is a conceptual representation of an area of password information illustrated in FIG. 3.

Assume that five persons share the shared-use portable telephone in this embodiment. As shown in FIG. 4, password information of these persons is stored in the password sub-areas, which is divided into five. Each person can use only one password sub-area fixedly provided in the password area 12. That is, the user "A" can use the password sub-area "a" only; the user "B" can use the password sub-area "b" only; the user "C" can use the password sub-area "c" only; the user "D" can use the password sub-area "d" only; and the user "E" can use the password sub-area "e" only. Each user need not utilize any password sub-area other than the one assigned to him or her, and is prohibited from using the password sub-areas of any other users of the shared-use portable telephone. Each of the password sub-areas "a" to "e" stores not only the password specific to the user, but also the log-in name assigned to the user.

Figure 5:
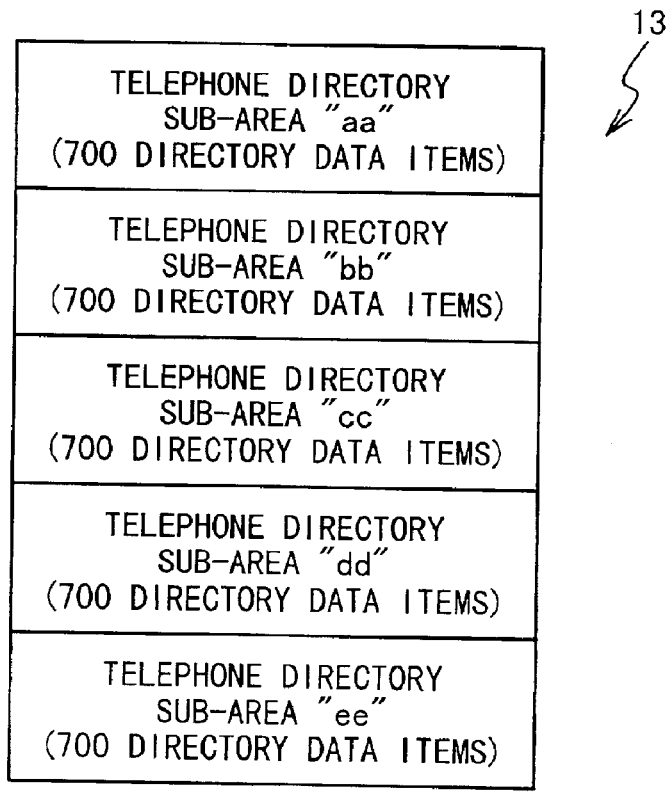
FIG. 5 is a conceptual representation of an area of telephone directory information depicted in FIG. 3.

FIG. 5 is a conceptual representation of the telephone directory area 13 depicted in FIG. 3. The telephone directory area 13, which stores telephone directory information, is composed of five telephone directory sub-areas. The user "A" can use the telephone directory sub-area "aa" only; the user "B" can use the telephone directory sub-area "bb" only; the user "C" can use the telephone directory sub-area "cc" only; the user "D" can use the telephone directory sub-area "dd" only; and the user "E" can use the telephone directory sub-area "ee" only. Each user need not utilize any telephone directory sub-area other than the one assigned to him or her, and is prohibited from using the telephone directory sub-areas of any other users of the portable telephone. Each of the telephone directory sub-areas "aa" to "ee" stores not only the telephone numbers of the person to whom the user often talk through the shared-use portable telephone, but also many telephone directory data items (e.g., 700 items) such as a name, the other telephone directory information concerned with telephone information.

Figure 6:
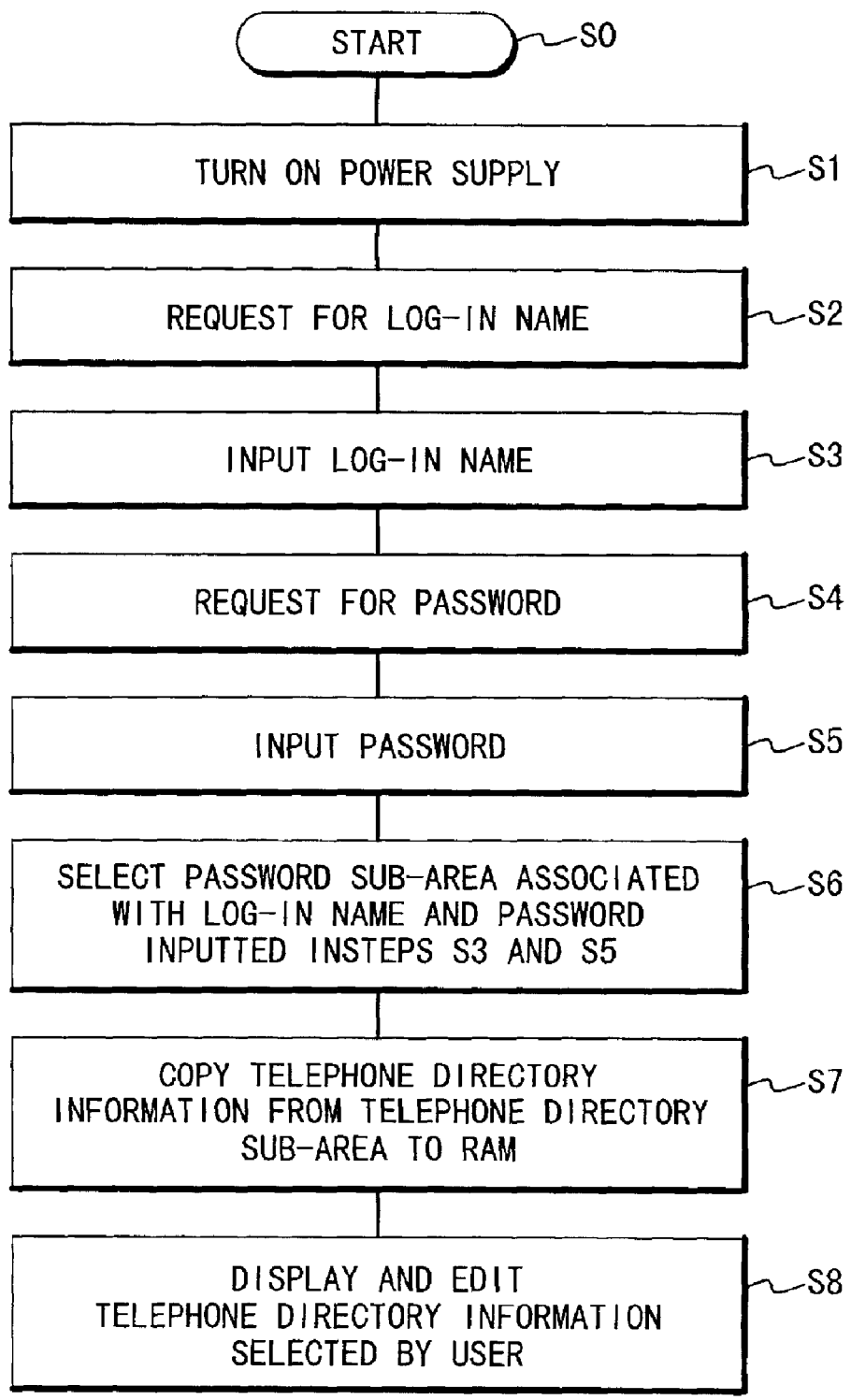
FIG. 6 is a flowchart explaining operations of the shared-use portable telephone according to the embodiment of the present invention.

FIG. 6 is a flowchart explaining an embodiment of a method of sharing portable telephone according to the present invention. More particularly, FIG. 6 illustrates the sequence of operations of the shared-use portable telephone 10 at the time of power ON. The password sub-area "a" stores or saves therein the log-in name "login-A" and password "Password-A" of the user "A" beforehand. The telephone directory sub-area "aa" stores therein the telephone directory information, which is beforehand stored by user "A".

Before the shared-use portable telephone 10 is used, the power supply (not shown) in the shared-use portable telephone 10 remains an OFF state (Step S0). The power supply is turned on when the user pushes the power-supply key (not shown) provided on the keypad section 5 (Step S1). After that, shared-use portable telephone 10 starts operation. Then, the processing is switched over to the user authentication processing which is described after step S2. More precisely, the LCD section 4 displays a message, requesting that the user should input his or her log-in name (Step S2). Thus, the shared-use portable telephone 10 starts waiting for a log-in name that the user "A", "B", "C", "D" or "E" will input.

In this condition, the user "A" operates the keypad section 5 to input authentication characters representing his or her log-in name "login-A" (Step S3). When the log-in name is inputted to the shared-use portable telephone 10, the LCD section 4 displays the message, requesting that the user should input his or her password (Step S4). The shared-use portable telephone 10 starts waiting for input from the user "A". In this condition, for identifying that the user of shared-use portable telephone 10 is the user "A", the user "A" operates the keypad section 5 to input his or her password "Password-A" (Step S5).

In Step S6, the control section 2 selects the password sub-area "a" from the five password sub-areas in accordance with the log-in name "login-A" inputted in Step S3 and the password "Password-A" inputted in Step S5. The password sub-area "a" stores therein the password data items to which the user "A" can access. More concretely, the control section 2 retrieves a log-in names which agrees fully with the log-in name "login-A" inputted at step S3 from the password sub areas "a" to "e" in password information area 12. Based on the retrieving result, the control section 2 selects the password sub-area "a" that stores the login name "login-A". By this selection, the user "A" can use the password sub-area "a", but cannot use any other password sub-areas "b" to "e".

Figure 7:
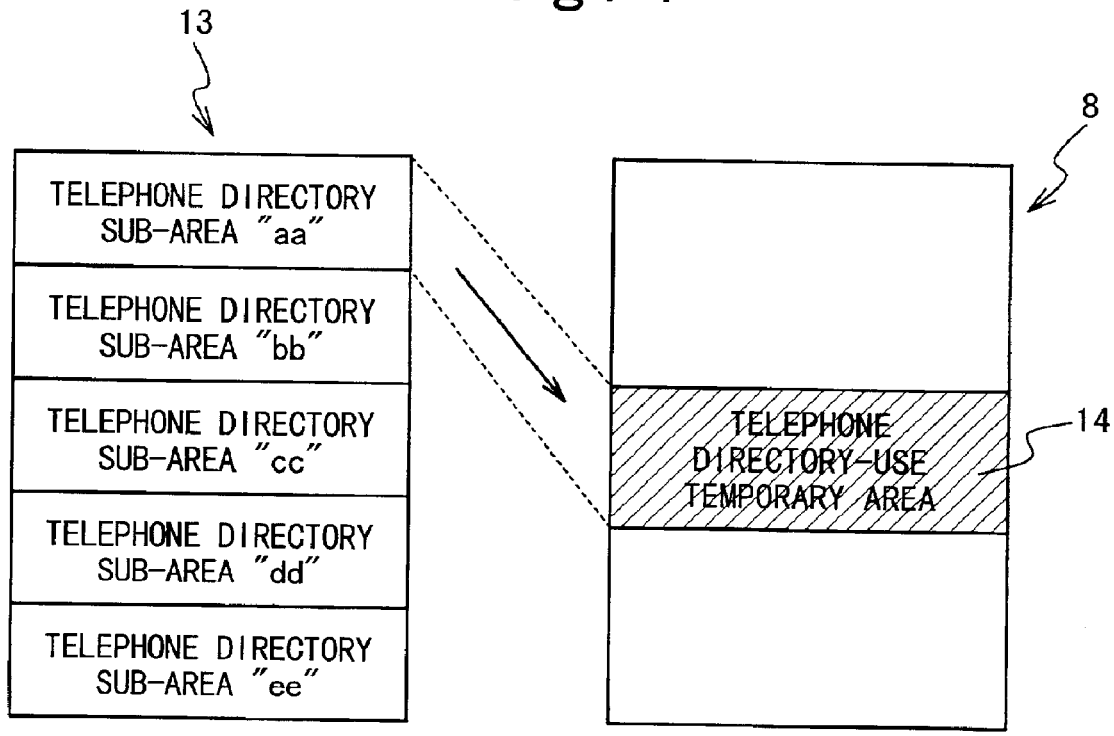
FIG. 7 is a diagram conceptually representing a relation between the ROM section and a RAM section.
Figure 8:
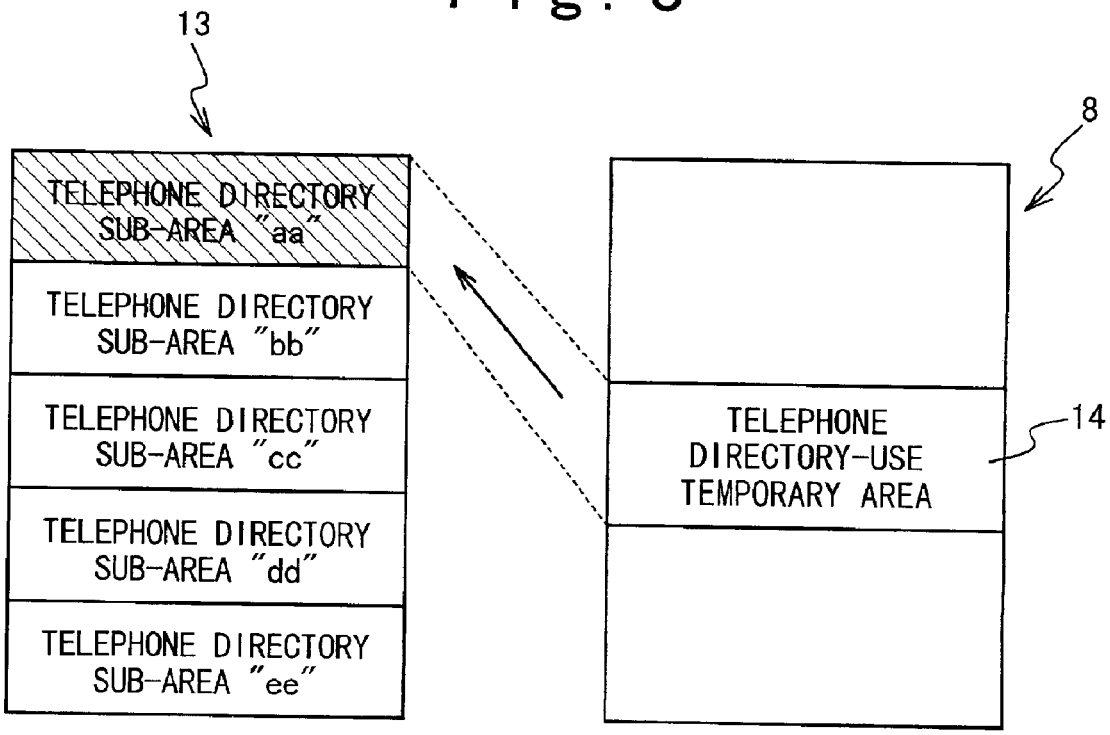
FIG. 8 is a diagram conceptually illustrating another relation between the ROM section and the RAM section.

The control section 2 checks whether or not the password input at Step S5 is identical to the password stored in the password sub-area "a". If the password is found not identical to the password stored in the sub-area "a", the control section 2 turns OFF the power supply, or the process returns to Step S2. On the other hand, if the password is found identical to the password stored in the sub-area "a", the user "A" is authenticated and authentication processing is completed. Then, the control section 2 determines the telephone directory sub-area "aa" as one that the user "A" can utilize. The user "A" can therefore use the telephone directory sub-area "aa", but cannot use the other telephone directory sub-areas "bb" to "ee". As FIG. 7 shows, the control section 2 copies the telephone directory data items held in the telephone directory sub-area "aa" of the ROM section 7 to a telephone directory-use temporary area 14 which is a fixation area in the RAM section 8 (Step S7). The telephone directory-use temporary area 14 therefore temporarily stores the telephone directory data items thus copied. The control section 2 accesses the telephone directory data items copied in the RAM section 7 and causes the LCD section 4 to display these telephone directory data items (Step S8). Alternatively, the user "A" may operate the keypad section 6, thereby to edit the telephone directory contents.

When the user "A" turns OFF the power supply of the shared-use portable telephone 10, the control section 2 copies the contents of the telephone directory-use temporary area 14 provided in the RAM section 8, to the telephone directory sub-area "aa" of the telephone directory area 13 provided in the ROM section 7. After copying the contents of the telephone directory-use temporary area 14, the control section 2 turns OFF the power supply that has been supplying power to the components of the shared-use portable telephone 10.

As described above, any authorized user, for example the user "A", may input his or her log-in name and password after turning ON the power supply of the shared-use portable telephone 10. Then, the user "A" can use only the telephone directory sub-area "aa" of the telephone directory area 13, which is allocated to him or her, while the other authorized users "B" to "E" cannot use the telephone directory sub-area "aa". If authenticated as one who can use the telephone 10, the user can access and edit the telephone directory data items managed by him or her. However, the user cannot access or edit the telephone directory data items managed by any other authorized user of the shared-use portable telephone 10. Thus, one shared-use portable telephone can be shared without referring to the telephone directory data items which the other user manages each other. Additionally, the telephone directory data items of each user would not be erased.

The object of the authentication by the password is not limited to the telephone directory data items. Rather, the object may be function setting information for managing the functions of the portable telephone. Hence, the area for setting the function may be provided in the ROM section 7 as a plurality of areas, which are divided and isolated from one another. Moreover, the ID information items, i.e., telephone numbers, are stored in the ID sub-areas which are provided in the ROM section 7 and which are divided and isolated from one another.

According to the shared-use portable telephone and the method of sharing a portable telephone of the present invention, each user can access to only information he or she manages without accessing to information of any other persons. Additionally, the information would not be erased. Furthermore, each user can access the ID information he or she manages and has no risk that his or her own ID information is accessed by the other users.

What is claimed is:

1. A shared-use portable telephone comprising:
   a RAM section which is commonly used by a plurality of users;
   a ROM section which includes:
     a plurality of password sub-areas in each of which a password assigned to one of the users is stored, and a plurality of personal information sub-areas corresponding to said plurality of the password word sub-areas, and storing a plurality of pieces of personal information managed by the users, respectively; and
     a control section which copies said pieces of personal information stored in a personal information sub-area selected based on said password to said RAM section, and, upon a turning off of power to said shared-use portable telephone, copies said pieces of personal information stored in said RAM section to said selected personal information sub-area.

2. The shared-use portable telephone according to claim 1, wherein said personal information is composed of telephone directory data assigned to the user.

3. The shared-use portable telephone according to claim 1, wherein said personal information is composed of identification (ID) data assigned to the user.

4. The shared-use portable telephone according to claim 1, wherein said personal information is composed of function setting information for setting a function peculiar to the user.

5. A method of sharing a portable telephone comprising:
   inputting a password assigned to a user;
   inputting a log-in name assigned to the user;
   selecting a password sub-area of a ROM section, in which said password of the user should be held, based on said inputted password and log-in name;
   judging whether or not said inputted password is identical to said password held in said password sub-area;
   selecting a personal information sub-area of said ROM section, in which personal information managed by the user is stored, when a result of said judging indicates that said inputted password is identical to said password held in said password sub-area;
   copying said personal information held in said selected personal information sub-area to a RAM section; and
   when said power supply is turned OFF, copying said personal information held in said RAM section to said selected personal information sub-area of said ROM section.

6. The method of sharing the portable telephone according to claim 5, further comprising: automatically turning OFF power supply of the portable telephone when the result of said judging indicates that said inputted password is not identical to said password held in said password sub-area.

7. The method of sharing the portable telephone according to claim 6, wherein said personal information stored in said RAM section is altered.

8. The method of sharing the portable telephone according to claim 7, wherein said log-in name is inputted before said password is inputted.

9. The method of sharing the portable telephone according to claim 5, wherein said personal information stored in said RAM section is altered.

10. The method of sharing the portable telephone according to claim 9, wherein said log-in name is inputted before said password is inputted.

11. The method of sharing the portable telephone according to claim 5, wherein said log-in name is inputted before said password is inputted.

* * * * *